May 17, 1955
W. H. FOSTER
2,708,436
STOCK FOOD COOKERS
Filed March 12, 1951
2 Sheets-Sheet 1
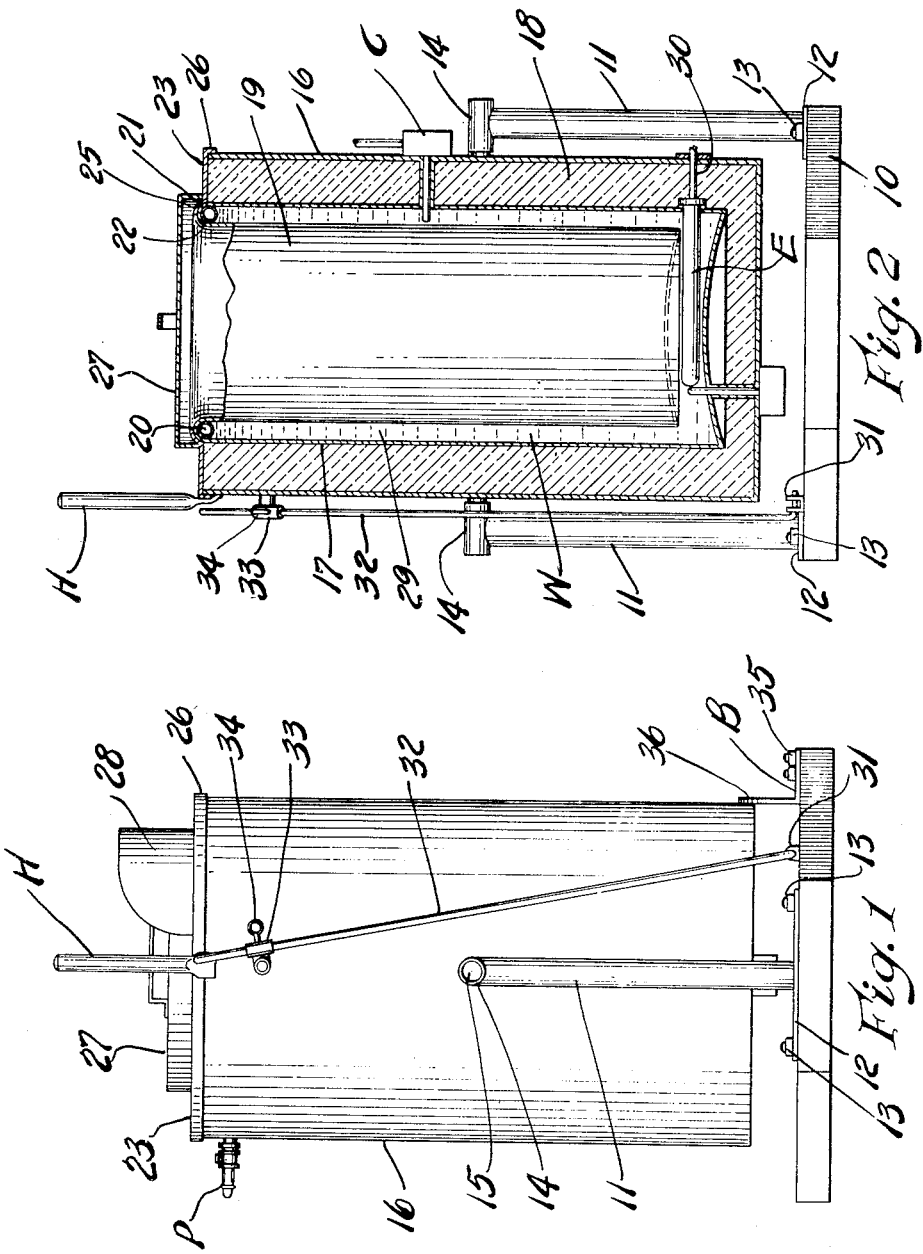
INVENTOR.
Wade H. Foster.
BY
Frank C. Leaman.
ATTORNEY

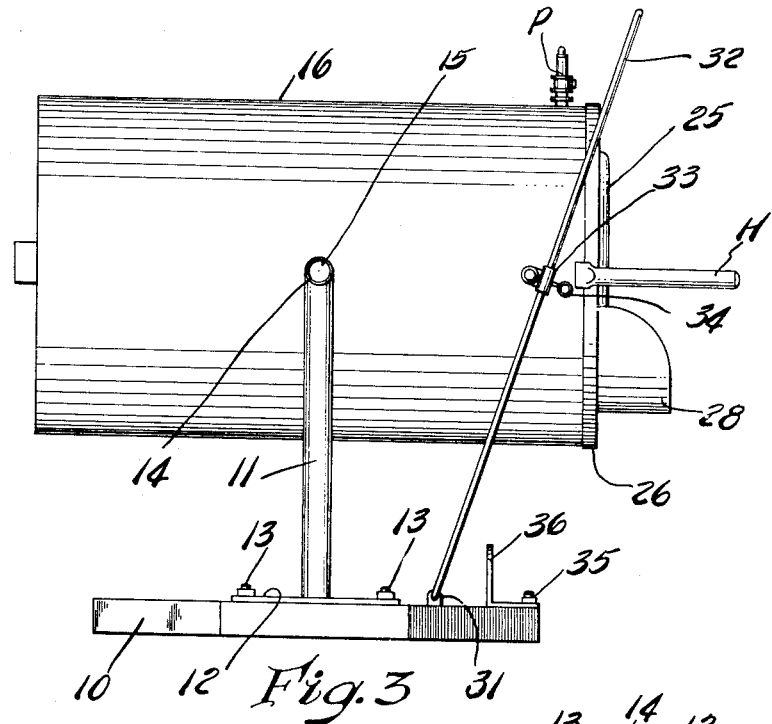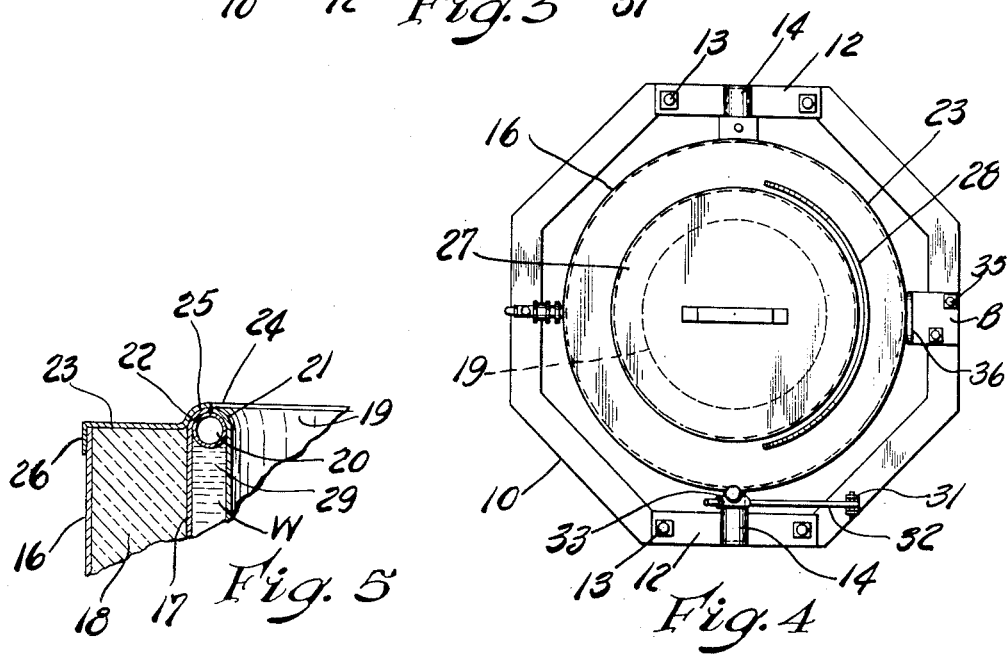

[Patent No.] 2,708,436
[Patented] May 17, 1955

2,708,436
STOCK FOOD COOKERS
Wade H. Foster, Bad Axe, Mich.

Application March 12, 1951, Serial No. 215,147

4 Claims. (Cl. 126—378)

This invention relates to cookers, and more particularly to stock food cookers used for cooking batches of grains, vegetables, and foods of various kinds.

One of the prime objects of the invention is to design a simple, practical and automatic cooker which can be placed closely adjacent the feed mixing box in the barn or other building, which requires little attention, and which is highly insulated so that batches of cooked materials will remain hot for several hours after the heating means has been disconnected.

Another object is to design a cooker of simplified design which can be readily constructed with a minimum of labor and in which the various parts can be rolled and welded in edge-to-edge abutting relation to form rigid, smooth and leak-proof joints.

A further object is to provide an open-ended shell or receptacle with a cover plate forming a closure for said opening and welded to the wall of the inner container, said weld being made simultaneously in alignment with the welding of the abutting edges of said container and cooker to form a rigid, unitary structure.

A further object still is to design a stock food cooker in which there is no exposed flame or heat element so that it can be used in a barn without fire hazard, which is very economical in use in that it can be disconnected when the food reaches the boiling point, so that it then operates as a pressure cooker, thus conserving energy and the savings incident thereto.

To the accomplishment of the foregoing and related ends, said invention then consists of the means hereinafter fully described and particularly pointed out in the claims, the annexed drawings and following description setting forth, in detail, certain means and one mode of carrying out the invention, such disclosed means and mode illustrating, however, but one of the various ways in which the principle of the invention may be utilized.

In the drawings:

Fig. 1 is a side elevational view of the cooker showing it in upright position.

Fig. 2 is a vertical, sectional, front elevational view.

Fig. 3 is a view similar to Fig. 1 showing the cooker in tilted position.

Fig. 4 is a top plan view of the cooker.

Fig. 5 is an enlarged, fragmentary, detail view illustrating the construction of the upper end of the cooker assembly.

Referring now more specifically to the drawings in which I have shown the preferred embodiment of my invention, the numeral 10 indicates an octagonal-shaped base which can be formed of wood or any other desired material; vertically disposed standards 11 are mounted on the edges of the base in spaced relation and include foot plates 12 which are secured to said base by means of bolts 13 or the like.

Horizontally disposed bearings 14 are provided on the upper end of the vertical uprights, and trunnions 15 are welded or otherwise secured to the container as shown and are revolvably journaled in the bearings 14 so that the unit may be swung to tilted position as clearly shown in Fig. 3 of the drawings.

The cooker unit comprises a preferably cylindrical outer shell 16 having an inner container 17 disposed therein in concentric relation, and a suitable insulating material 18 is provided in said space between the shell and container, all as clearly shown in Fig. 2 of the drawings.

A cooker pot 19 is mounted in the inner container 17 and is welded thereto, a circular pipe 20 being provided in the space between the inner container and the cooker pot, and the upper ends of the pot and container are rolled over said pipe 20 as indicated at 21 and 22 respectively to bring the edges thereof into intimate abutting relation so that they may be welded together and to said pipe.

A top plate 23 forms a closure for the upper end of the outer shell, and a centrally disposed opening 24 is provided therein, the material 25 at the edge of the marginal opening being rolled over the rolled section 22 of the container to nest thereon with the inner edge in vertical alignment with the seam or abutting edges of the cooker pot and inner container respectively, so that the top plate and abutting edges of the cooker and inner receptacle may be welded to the pipe as a unit to form a smooth, continuous, leak-proof joint thereat, the outer edge of the top plate being flanged as shown at 26 to provide a closure for the space between the inner receptacle and outer shell, and this can be welded or secured in position in any desired manner.

A suitable cover 27 fits over the rolled section 25 of the top plate and forms a closure for the open end of the cooker pot, and a pouring lip 28 is provided on the top plate as shown, and directs the cooked material into a receptacle or pail or the like (not shown) when the cooker is being emptied.

The cooker pot 19 is suspended in the well W which is filled with a suitable oil or liquid 29, and a heater element E is inserted in said well below said pot, suitable connectors 30 leading from said element to any convenient source of current supply, and a standard thermostatic control member C is mounted on the side wall of the shell for proper regulation of the unit.

A tell-tale T (not shown) can be mounted on the side wall of the outer shell to indicate when the current is "on" or "off," and a pop valve P is provided at the upper end of the shell to eliminate the possibility of excessive pressure being built up in the cooker.

A vertically disposed handle H is secured to the shell and extends upwardly as shown to facilitate tilting or manipulation of the unit to discharge the cooked food, or for cleansing of the cooking pot.

A clip 31 is secured to the base member 10 directly adjacent one of the plates 12, and a vertically disposed rod 32 is pivotally secured thereto, the upper end of said rod extending through an offset sleeve 33 which is pivotally mounted on the side wall of the unit, and a set nut 34 is provided on said sleeve so that the rod may be secured and held in set position as clearly shown in Fig. 3 of the drawing.

An angularly shaped bracket B is secured to the base 10 by means of bolts 35, the upper leg 36 of said bracket extending into the path of travel of the cooker shell and forming a stop to limit swing thereof.

To load the cooker, it is merely necessary to secure the shell in upright position, remove the cover 27 and place the material in the pot, replace the cover and connect the heating element to a source of electrical supply.

When the material has been cooked and it is desired to remove the cooked food, the set nut 34 is released, and the handle manipulated to tilt the cooker to desired position; the set screw is again set, and the shell will be held in tilted position to discharge the cooked contents for cleaning purposes, after which it can be swung upright as above described.

From the foregoing description, it will be obvious that I have perfected a very simple, practical and convenient cooker structure which can be economically manufactured and operated, and by means of which large batches of foods can be easily cooked and handled.

What I claim is:

1. A cooker of the class described comprising an outer shell, an inner receptacle and a cooker pot concentrically arranged in spaced-apart relation in said shell, an annular pipe interposed between the upper ends of the inner receptacle and the cooker pot, with the upper edges of said pot and rceptacle rolled on said pipe to bring the edges into abutting relation, a top plate forming a closure for the open upper end of the shell and having a centrally disposed opening therein, the marginal edge of said opening being rolled over the rolled edge of the inner receptacle and the pipe, the edges of the receptacle, the pot and the top plate respectively being welded together by a single line of weld.

2. In a device of the class described, a cooker unit comprising an outer shell open at its upper end, a concentrically arranged inner receptacle and a cooker pot in said shell in transverse spaced relation, insulation between the inner receptacle and the shell, a liquid well surrounding the cooker pot, an annular member interposed in the upper end of the liquid well and over which the upper ends of the receptacle and pot are rolled to bring the edegs thereof into abutting relation, a top plate forming a closure for the open end of the shell and provided with a centrally disposed opening therein with the marginal edge of the opening rolled over the rolled upper edge of the receptacle, the said annular member and the edges of the top plate, receptacle and cooker pot being secured together by a single line of weld.

3. The combination defined in claim 2 in which the marginal edge of the opening in the top plate is in vertical alignment with the abutting edges of the receptacle and cooker pot respectively.

4. The combination defined in claim 2 in which a heater element is provided in the liquid well below the cooker pot, and a thermostat is extended into the well for controlling the temperature of the liquid therein.

References Cited in the file of this patent

UNITED STATES PATENTS

| Number | Name | Date |
|---|---|---|
| 978,491 | Savage | Dec. 13, 1910 |
| 1,142,587 | Ledbetter | June 8, 1915 |
| 1,422,064 | Kane | July 4, 1922 |
| 1,507,414 | Ney | Sept. 2, 1924 |
| 1,525,310 | McDonald | Feb. 3, 1925 |
| 1,566,221 | Lindemuth | Dec. 15, 1925 |
| 1,937,227 | Johnson | Nov. 28, 1933 |
| 1,983,118 | Bourque | Dec. 4, 1934 |
| 2,280,150 | Hasse et al. | Apr. 21, 1942 |
| 2,411,006 | Sharp | Nov. 12, 1946 |
| 2,471,512 | Barlock | May 31, 1949 |

FOREIGN PATENTS

| Number | Country | Date |
|---|---|---|
| 24,620 of 1935 | Australia | Sept. 26, 1935 |
| 472,068 | Great Britain | Sept. 16, 1937 |